Patented June 5, 1934

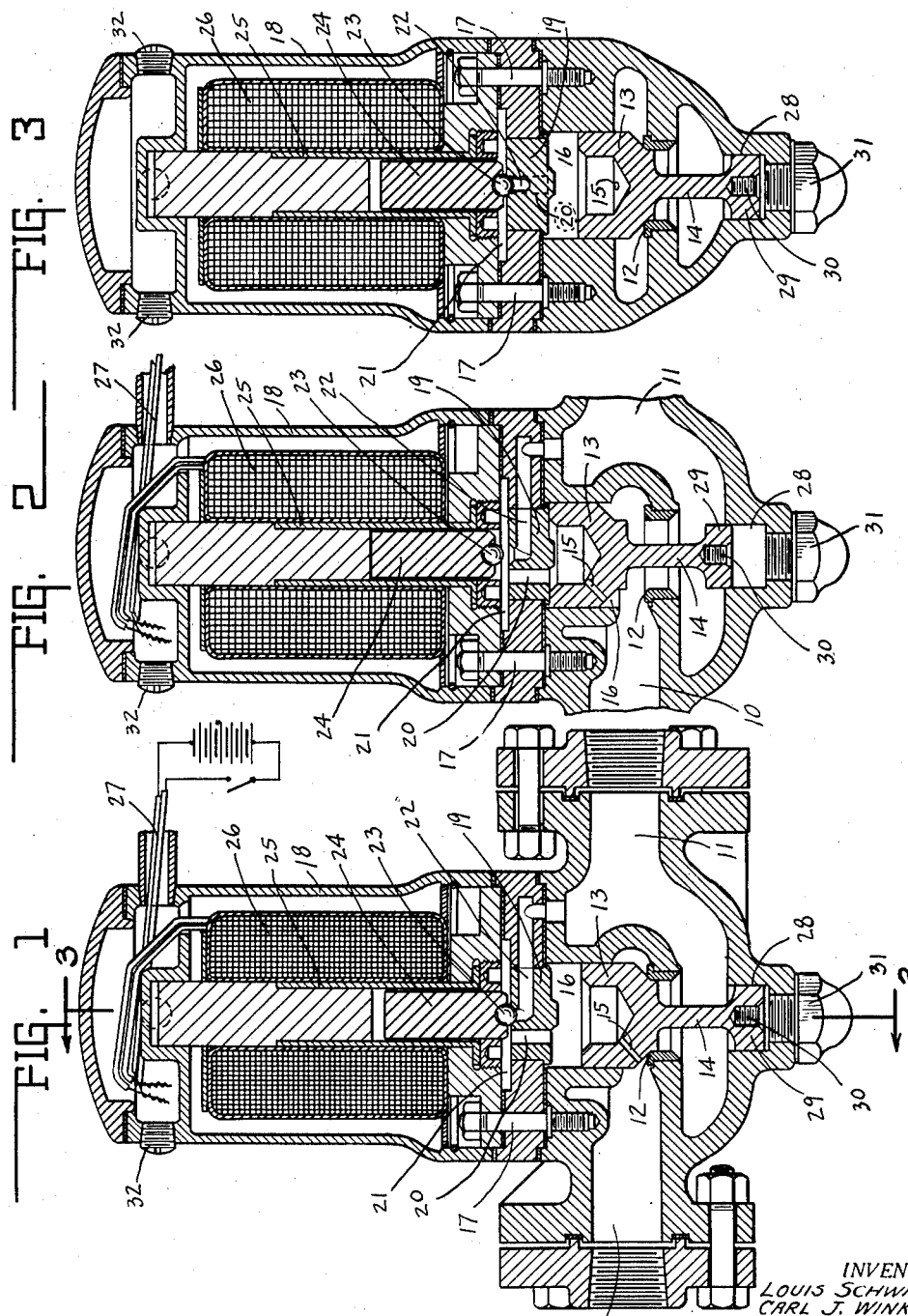

1,961,599

UNITED STATES PATENT OFFICE 1,961,599

VALVE

Louis Schwitzer, Carl J. Winkler, and Kurt A. Beier, Indianapolis, Ind., assignors, by mesne assignments, to General Fire Extinguisher Company, Providence, R. I., a corporation of Delaware Application December 18, 1930, Serial No. 503,182

2 Claims. (Cl. 137—139)

This invention relates to a valve for controlling the passage of a fluid and particularly that type of valve which may be placed in both low and high pressure lines for either manual or remote control.

The principal feature of the invention resides in the provision of a valve capable of controlling high pressures, which may be termed as "packless" wherein no moving part operates through a packing. This feature of the invention is most important in a high pressure valve and valuable in that it eliminates any difficulties caused by leakage through the packing surrounding the movable part so that the valve is more dependable, needs less attention and is advantageous for that reason when remotely placed so as to be inaccessible.

Another important advantage of the packless feature of the valve resides in its application to high pressure lines through which obnoxious odored gases or liquids pass. This is particularly true in the use of the valve in connection with a refrigerating industry where ammonia and sulphur dioxide gases are used.

One feature of the invention resides in the stable and compact arrangement of a pilot valve and actuating means therefor which will permit of the valve being packless and operate under high pressure with the minimum of actuating force.

Another feature of the invention resides in the arrangement for conveniently grinding the valve on its seat without the necessity of tearing down the valve structure.

A further feature of the invention involves the use of a dash pot for cushioning the closing movement of the valve, and thereby prevent a sharp seating such as will cause undue wear thereon.

Other features of the invention will be hereinafter more specifically set forth and described.

The full nature of the invention will be more clearly understood from the accompanying drawing and the following description and claims.

Fig. 1 is a central vertical section through the valve showing it in closed position. Fig. 2 is the same as Fig. 1 showing it in open position. Fig. 3 is a section taken on the lines 3—3 of Fig. 1.

In the drawing there is shown a valve housing having the inlet port 10 and an outlet port 11 communicating through the valve seat 12. Supported upon the seat 12 so as to close the same, there is a valve 13 having a cup-shaped upper portion and a downwardly extending stem 14. Said valve is provided with a port 15 extending through the wall of the cup-shaped portion to permit the passage of fluid from the pressure side of the inlet 10 to the interior of the valve and the cylinder 16 in which the valve reciprocates.

Mounted above the valve and cylinder 16 and secured rigidly thereto by the bolts 17 there is a housing or casing 18. Sealed between the cylinder 16 and the casing 18, there is a pilot valve seat 19 through which a port 20 extends, communicating with the cylinder 16 and the chamber 21. A port or passageway 22 extends from the chamber 21 to the low pressure side or outlet 11 of the valve housing and is closed by the ball pilot valve 23.

The pilot valve 23 is secured to an upwardly extending solenoid plunger 24 adapted to freely slide in the sleeve 25. The sleeve 25 and solenoid plunger are sealed in and surrounded by the solenoid winding 26 from which the wires 27 lead.

In operation, the valve is normally in closed position as shown in Fig. 1 with high pressure at the inlet side 10 and low pressure at the outlet side 11. The pressure at the side 10 causes the fluid to pass through the port 15 into the cylinder 16 and thence through the port 20 into the chamber 21 where it is stopped from further passage by the pilot valve 23. The pressure of the fluid in the cylinder 16 exerts a downward pressure on the valve 13 greater than the upward pressure exerted thereon from the low pressure side 11. Thus, the valve is firmly held in its seated position.

When it is desired to open the valve, the solenoid winding 26 is energized so as to lift the solenoid plunger 24 with the pilot valve 23 attached thereto. This permits passage of the high pressure fluid from the chamber 21 through the passage 22 into the low pressure side 11. As the port 20 and passage 22 are substantially larger than the port 15, the pressure in the cylinder 16 will be relieved while the pressure on the lower side of the valve will be increased. This increase of pressure on the low side of the valve and decrease on the top side of the valve will cause the valve to be lifted from the valve seat, thereby permitting free passage of the fluid therethrough as shown in Fig. 2.

When it is desired to close the valve, the solenoid winding 26 is deenergized, permitting the solenoid plunger 24 to drop by gravity so that the pilot valve 23 closes the passage 22. Pressure will again be built up in the cylinder 16 by passage of the fluid through the port 15 until the pressure above the valve becomes as great or equalizes the pressure below the valve, whereupon the valve will drop by gravity to its closed position.

The closing action would be rapid and positive to the extent that there would be a decided noise when the valve drops onto the seat with the consequent wear therebetween. To avoid this action, there is provided a dash pot for cushioning the downward movement of the valve and permitting it to gently seat in closed position. This comprises a cylinder 28 formed in the lower portion of the valve in which the piston head 29 slidably fits, said head being formed on the lower end of the stem 14. In the closing movement of the valve, the head 29 must force the fluid from the cylinder 28 before the valve seats, thereby cushioning the seating action of the valve.

The head 29 is provided with a recess 30 having internal screw threads for receiving a wrench which may be inserted therein upon removal of the nut 31 from the bottom of the valve housing. Upon screwing a suitable wrench or tool into the recess 30, the valve may be ground and seated without tearing down the valve structure.

Whereas the port 15 is shown as passing through the wall of the valve, passage of the fluid from the pressure side 10 to the cylinder 16 may be accomplished by providing grooves in the contacting walls of the cylinder or valve, or allowing the valve to have a sloppy fit therein.

The ball valve secured to the solenoid plunger insures a perfect fit in its valve seat, regardless of any misalignment or slightly cocked position of the solenoid plunger 24. This permits of economic construction and free movement of the solenoid plunger within the sleeve 25.

The casing 18 is provided with four lead-in plugs 32 so that connections of the wires 27 with the solenoid plunger may be made from any one of four directions, which is advantageous in installation of the valve.

The invention shown and described herein is a preferred form in which various modifications and changes in the specific details thereof may be made without departing from the invention within the scope of the following claims.

The invention claimed is:

1. A valve mechanism including a housing having a high pressure inlet and low pressure outlet, a main valve seated therebetween for controlling the passage of fluid therethrough, a cylinder in which said main valve is operable, said cylinder being in communication with the high pressure inlet, a valve seat closing said cylinder above said valve and having a chamber on the other side thereof, a port communicating between said cylinder and chamber, a second port communicating between said chamber and the low pressure outlet, a pilot valve for controlling said second mentioned port, means for actuating said pilot valve, and a downwardly extending stem on said valve provided with a screw threaded recess therein adapted to receive a tool for manually manipulating said valve.

2. A valve mechanism comprising a casing having a bottom section provided with a side inlet and a side outlet; a partition within said section between the inlet and outlet constituting a valve seat; a main valve movable to and from said seat; a cylinder in which said main valve is movable having a restricted connection with the inlet whereby the inlet pressure may be applied to said valve to hold it seated; a second section of said casing constituting a closure for the cylinder above said valve, having a port therethrough connecting with the cylinder and having a separate chamber therein; a port connecting said separate chamber with the said outlet; a third section of said casing, mounted on the second section and forming therewith an intermediate chamber into which the port from the cylinder opens; an opening from said intermediate chamber to the separate chamber of the second section, the edge of said opening constituting a valve seat; a pilot valve for the last said seat; and electrically controlled means housed in the said third section for actuating said pilot valve; all the said valves and moving elements being completely housed in said casing.

LOUIS SCHWITZER.
CARL J. WINKLER.
KURT A. BEIER.